Aug. 2, 1949.   A. KREMER ET AL   2,477,697
UPHOLSTERY
Filed May 20, 1944

Inventors.
ARTHUR KREMER
MICHAEL RACHLIS.
By Haseltine, Lake & Co
Attorneys.

Patented Aug. 2, 1949

2,477,697

UNITED STATES PATENT OFFICE 2,477,697

UPHOLSTERY

Arthur Kremer and Michael Rachlis,
London, England

Application May 20, 1944, Serial No. 536,470
In Great Britain November 9, 1943

3 Claims. (Cl. 45—138)

This invention relates to upholstery and particularly to means for securing the upholstery and/or the upholstery fabric to the frame.

More specifically, the invention relates to an attachment for securing upholstery to a frame in which a channel is provided at the edge of the frame having a portion projecting from the frame with a clearance between its free edge and the frame, open to the rear face thereof, within which an end portion of the upholstery is held.

It is an object of the invention to facilitate the insertion and the securing of the end of the upholstery in such channels and to overcome any tendency of the end of the upholstery to become loose and to move or slip out of the channel.

To this end, the attachment of the invention provides within the channel portion intended to receive the end portion of the upholstery elastic means for elastically retaining therewith, between the channel portion and the frame, the end of the upholstery.

Figure 2:
Figure 1:
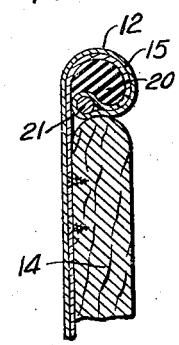

In the drawings, Figure 1 is a sectional view, with parts broken away, of the upholstery and frame, showing the upholstery secured to the frame; and Figure 2 is an end portion of a portion of the upholstery, showing a rod secured to one end thereof.

As shown in Figure 1, the frame 14 has a channel member 15 secured to the top thereof by any suitable means such as screws as shown. The channel member 15 is preferably rigid, but may be resilient if desired. The free edge of the channel member 15 is located beyond the inner face of the frame 14. The upholstery indicated at 12 in Figure 1 has a rod 21 secured thereto by any suitable means, such as stitching or the like. A rubber gasket 20 is disposed within the channel 15 to provide the necessary resilient pressure. In use, as illustrated in Figure 1, the rubber gasket 20 is inserted between the channel member 15 and the top of the frame 14, after which the upholstery is positioned in place as indicated and the rod 21 secured at the end of the upholstery is positioned between the top of the frame 14 and the under side of the gasket 20 in a manner to compress the gasket, as illustrated. The top of the frame 14, rubber gasket 20 and rod 21 are held in their cooperative position by the channel member 15 to thus secure the end of the upholstery in its proper position and prevent escape of the same once it has been forced into the position as shown.

It will be understood that in referring to upholstery, we mean upholstery and/or upholstery fabric and we intend to include not only sprung upholstery but upholstery in the form of sheets of elastic material such as sponge rubber, rubbered horsehair sponge or quilted sheets with horsehair, and other upholstery materials such as wool.

What we claim and desire to secure by Letters Patent of the United States is:

1. Means of attaching upholstery to a frame, comprising a channel member rigid with said frame and having a portion projecting from said frame, said channel having a clearance between its free edge and said frame, open to the rear face thereof; said channel portion adapted to receive an end portion of said upholstery therein and being provided with an elastic means for elastically retaining therewith said end portion of the upholstery between said channel portion and said frame, and an enlargement upon the edge of said end portion of the upholstery arranged to resist displacement of the said end portion by reaction against said elastic means.

2. Means as set forth in claim 1 wherein said end portion of the upholstery has a loop in said channel portion, a rod being provided adapted to be disposed in said loop and having a cross section so as when disposed in said loop and said channel portion to compress said elastic means within said channel portion.

3. Means as set forth in claim 1 wherein said end portion of the upholstery has a rod secured thereto at its free end and wherein said elastic means consists of a rubber gasket; said free end of the upholstery with said rod secured thereto adapted to be forced into said channel portion against the elasticity of said rubber gasket and to be elastically held therein by said rubber gasket.

ARTHUR KREMER.
MICHAEL RACHLIS.

REFERENCES CITED

The following references are of record in the file of this patent:

UNITED STATES PATENTS

| Number    | Name        | Date           |
|-----------|-------------|----------------|
| 1,664,121 | Ledwinka    | Mar. 27, 1928  |
| 1,719,532 | Cable       | July 2, 1929   |
| 1,864,477 | Stannard    | June 21, 1932  |
| 1,888,084 | Howard et al. | Nov. 15, 1932 |
| 2,027,644 | Klee        | Jan. 14, 1936  |
| 2,188,560 | Todd        | Jan. 30, 1940  |
| 2,255,327 | Morgan      | Sept. 9, 1941  |
| 2,343,505 | Gedris      | Mar. 7, 1944   |